United States Patent

Fenwick et al.

Patent Number: 5,848,258
Date of Patent: Dec. 8, 1998

[54] MEMORY BANK ADDRESSING SCHEME

[75] Inventors: David M. Fenwick, Nashua, N.H.; Denis Foley; Stephen R. Van Doren, both of Shrewsbury, Mass.; Dave Hartwell, Bolton, Mass.

[73] Assignee: Digital Equipment Corporation, Maynard, Mass.

[21] Appl. No.: 711,387

[22] Filed: Sep. 6, 1996

Related U.S. Application Data

[63] Continuation of Ser. No. 269,238, Jun. 30, 1994, abandoned.

[51] Int. Cl.[6] .................................................. G06F 12/02
[52] U.S. Cl. ............................................ 395/405; 395/824
[58] Field of Search ..................................... 395/853, 824, 395/405

[56] References Cited

U.S. PATENT DOCUMENTS

| | | | |
|---|---|---|---|
| 4,600,986 | 7/1986 | Scheuneman | 395/496 |
| 4,933,846 | 6/1990 | Humphrey | 395/287 |
| 5,274,788 | 12/1993 | Koike | 395/425 |
| 5,303,360 | 4/1994 | Hilton | 395/425 |
| 5,377,324 | 12/1994 | Kabemoto | 395/200 |
| 5,530,934 | 6/1996 | Hilton | 395/405 |

*Primary Examiner*—Eric Coleman
*Attorney, Agent, or Firm*—Denis G. Maloney; Arthur W. Fisher

[57] ABSTRACT

In accordance with the present invention, an apparatus includes a system bus having memory bank identification signals. Coupled to the system bus are at least two memory modules, each having at least one memory bank, and at least one commander module. The commander module contains decode logic which includes memory mapping registers associated with unique values to be driven on the memory bank identification signals. The memory banks contain compare logic including a virtual node identification register which stores a predetermined value to be compared with the value driven on the memory bank identification signals to determine if the memory bank is the target of the current transaction. Thus, memory banks need not decode the entire system bus address to determine if they are the target of the transaction which reduces the time required to complete a transaction with memory. Further, the apparatus allows memory modules having a different number of memory banks and memory banks capable of storing a different number of addressable locations to be efficiently used in the same computer system.

12 Claims, 7 Drawing Sheets

MEMORY BANK ADDRESSING SCHEME

This application is a continuation of application Ser. No. 08/269,238, filed Jun. 30, 1994 now abandoned.

BACKGROUND OF THE INVENTION

This invention relates generally to computer systems, and more particularly to the access of memory modules directly connected to a system bus of a computer system.

As it is known in the art, computer systems generally include at least one central processing unit (CPU) module, a main memory for storing data, at least one input/output (I/O) module, and a system bus coupling the aforementioned devices to the CPU module. The system bus typically includes data, address, and control lines.

Often, the main memory includes a plurality of independent memory modules each having an interface to the system bus. Each memory module contains semiconductor chips having a predetermined number of memory cells. The chips are often referred to as RAM, Random Access Memory, or DRAM, Dynamic Random Access Memory, in that each storage location is randomly addressable, as distinguished from other types of memory devices such as magnetic tape or disk which are sequentially accessible, in that a number of storage locations are scanned before reaching the desired addressed location.

As an example, 64K memory chip has $2^{16}$ or 65,536 addressable storage locations. Each storage location is randomly addressable and contains one memory cell which stores one binary bit of data.

The address range of the computer system is determined primarily by the number of address lines that are provided on the system bus. An address range of 0–64K requires $2^{16}$ permutations of 16 binary bits. Increasing the address bus by one line effectively doubles the previous address range of the system.

It should be noted that although memory capacity is related to the size of the address range, it is not the same as the address range. Most memory modules store multiple bytes of data at each addressable location. Thus, memory capacity is a function of the number of addressable locations (i.e., address range) and the amount of data stored at each location.

Generally each memory module responds to a different address range within the overall address range of the computer system. The size of each module's address range corresponds to the number of addressable locations on the module. The starting address of a module's address range may be determined by virtue of the position (i.e., backplane slot) in which the module is placed within the computer system, if each module has the same capacity, or the starting address may be assigned through the use of memory configuration software and hardware which determines the number of addressable locations of each memory module in the system prior to assigning address ranges.

CPUs, as well as other commander modules such as the I/O interface, are capable of initiating transactions (i.e., read or write) to main memory on the system bus. In order to initiate a transaction on the system bus, a CPU must first gain control of the system bus which is often accomplished by arbitrating for the bus. Once the CPU has gained control of the system bus, the CPU drives an address and a command. If the command is a write to main memory, the CPU will also drive data on the system bus during a data cycle.

The address lines indicates a location in main memory which the CPU wishes to read data from or write data to. Typically, when an address is driven, each memory module decodes the address to determine if the address being driven is within its address range such that it should respond. The time it takes for the memory module to decode the address on the system bus and respond directly increases the amount of time required to complete a transaction.

The time it takes to complete a transaction may also be increased in systems which allow CPUs to access unavailable or busy memory modules. There are often times when a memory module will be inaccessible because it is busy with another task, such as a memory refresh. Additionally, a memory module may be unavailable for a period of time following a write transaction where the CPU has transferred the data and released the system bus, but the memory module is still involved with writing the data into the RAMs. To avoid sending transactions to a memory bank which is unavailable, a sophisticated computer system may require all commander modules (i.e., all modules capable of issuing transactions directed at main memory) to decode addresses sent on the system bus by all other modules to determine and track which memory banks are in use.

Prior to initiating a transaction in such a system, the CPU must determine whether the memory bank it wishes to access (i.e., target) is in use. If the bank is in use, the CPU will not attempt to gain control of the system bus in order to issue the transaction, and if the bank is not in use, then the CPU will attempt to gain control of the system bus and issue the transaction. This address decode requires decode hardware and requires time which directly increases the amount of time necessary to complete the memory transaction.

Many different memory configurations have been designed in order to reduce the probability that a CPU will access an unavailable memory module. Some of these configurations include partitioning the memory devices (i.e., RAM) of each memory module into multiple banks and interleaving memory modules or memory banks.

Where memory modules are partitioned to include multiple banks, the access circuitry of each bank responds to a different range of addresses allowing each bank to be independently accessed. Further, each bank has its own read and write circuitry such that each bank is entirely independent with the exception that each bank shares the memory module's system bus interface logic. Having multiple banks reduces the probability that a CPU will access an unavailable bank.

Interleaving is the practice of storing data in consecutive memory locations in alternating or successive memory banks. In a conventional 2-way interleaved memory, there is an "even" memory bank and an "odd" memory bank for each range of addresses. Any two sequential memory locations are stored in different memory banks. The interleaved memory technique is based on the premise that there is a reasonably high probability that sequential accesses to memory will be in successive memory locations. Thus, sequential memory locations are placed in different banks so that they can be accessed quickly. The possibility remains, however, that a transaction will be directed at a memory bank which is unavailable.

In conventional computer systems, aside from increased transaction completion time due to memory module address decode time, there is no flexibility or limited flexibility to configure main memory. Prior art computer systems often require each memory module to have the same number of addressable locations and/or the same number of banks. Computer systems which allow interleaving often require all memory banks to be interleaved in the same fashion. Thus, newly developed memory modules may have capabilities which cannot be efficiently utilized in existing computer systems or which cannot be used at all in existing computer systems.

SUMMARY OF THE INVENTION

In accordance with the present invention, an apparatus includes a system bus having memory bank identification signals. Coupled to the system bus are memory modules which have at least one memory bank. Additionally, at least one commander module is coupled to the system bus, where a commander module is a module capable of initiating transactions on the system bus and includes logic for generating addresses to be driven on the system bus, such addresses indicating which of the memory banks the commander wants to access. The commander module also includes logic for decoding the addresses and logic for providing values to be driven on the memory bank identification signals. Further, each memory bank includes logic which responds to commander initiated transactions on the system bus when a predetermined value is driven on the memory bank identification signals. With such an arrangement, the time to complete a memory transaction is reduced. Instead of requiring the memory banks to decode the entire system bus address to determine if they are the target of the current transaction, the memory banks need only compare the value driven on the memory bank identification signals to a predetermined value. Thus, the overall time required to complete a transaction with the memory banks is reduced which improves system performance.

In accordance with a further aspect of the invention, the commander module decode logic includes memory mapping registers, each of which correspond to at least one unique value to be driven on the memory bank identification signals. Associated with each memory mapping register is matching logic which determines whether the address to be driven by the commander module falls within the address range of the associated memory mapping register. The commander module decode logic also includes encoding logic for providing unique values associated with each memory mapping register to the memory bank identification signals.

In a first embodiment, the memory mapping registers include an address field, an address mask field, and a valid bit. This apparatus allows for efficient, flexible configuration of memory modules, including memory modules having a different number of memory banks and memory modules having memory banks capable of storing a different number of addressable locations worth of data. In a second embodiment, flexible memory interleaving among some or all memory banks is made possible by further including an interleave field and an interleave mask field in the memory mapping registers. While a third embodiment permits a reduction in the number of necessary memory mapping registers by allowing each memory mapping register to be associated with multiple unique values to be driven on the memory bank identification signals by further including a multiple-bank matching field.

In accordance with a further aspect of the invention, the responder logic of each memory module includes a virtual node identification register for storing a predetermined value. Therefore, a memory bank need only compare the value driven on the memory bank identification signals to the value stored in its virtual node identification register to determine if it is the target of the current system bus transaction. With such an arrangement, the time to access memory banks is reduced and main memory may be flexibly configured and include memory modules having different capabilities.

DETAILED DESCRIPTION OF THE PREFERRED EMBODIMENT

As noted above, this invention involves an apparatus for accessing memory modules.

Figure 1:
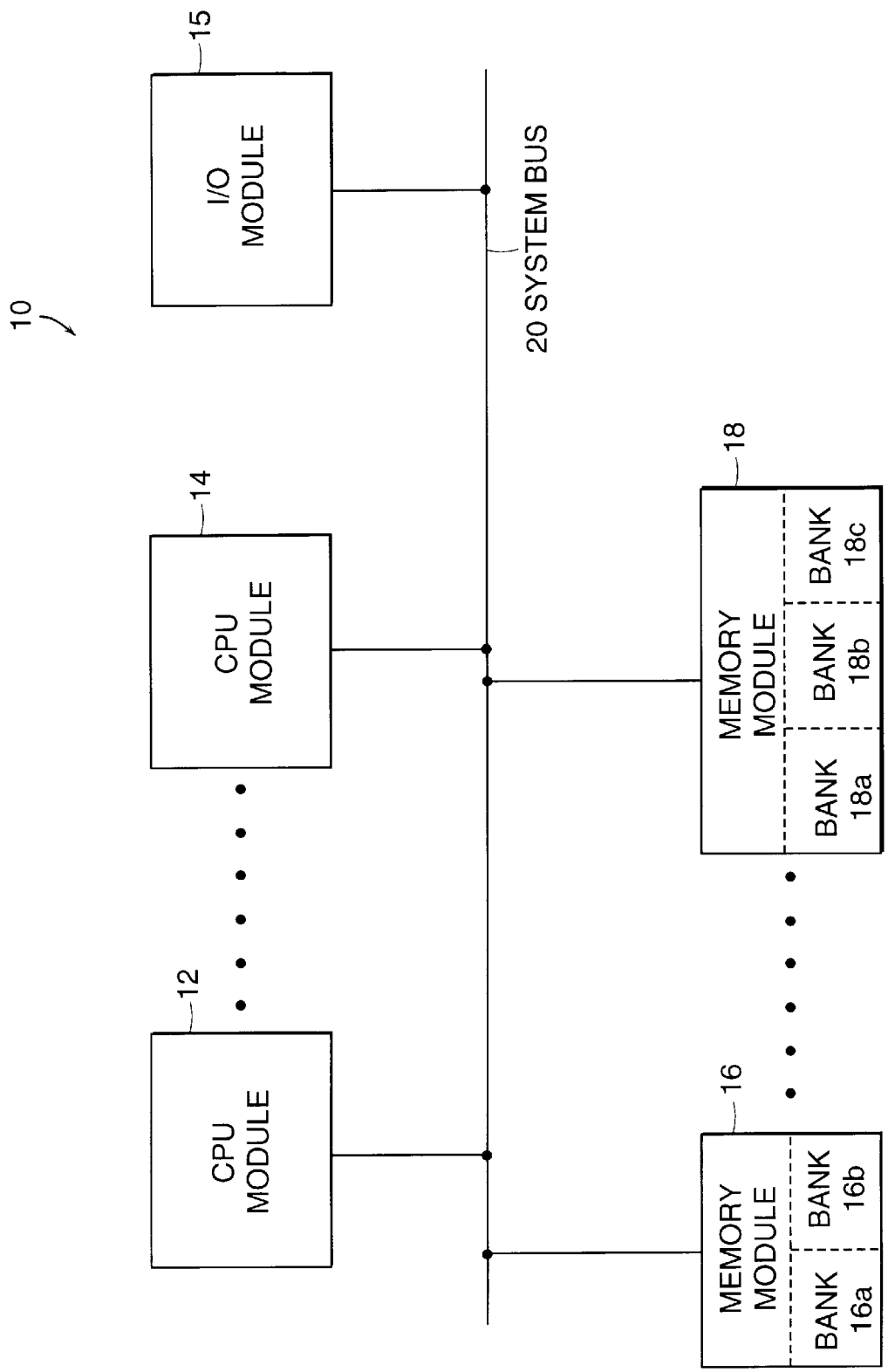
FIG. 1 is a block diagram of a computer system having a plurality of Central Processing Unit (i.e., CPU) modules, an Input/Output (i.e., I/O) module, and a plurality of memory module connected together by a system bus.

Referring now to FIG. 1, a computer system 10 is shown to include a plurality of central processing unit (CPU) modules 12, 14, an input output (I/O) module 15, and a plurality of memory modules 16, 18 coupled together by a system bus 20. For simplicity, only two CPUs, one I/O, and two memory modules are shown, however, it should be understood that computer system 10 could have more of each module. There may also be other modules (not shown) connected to the system bus.

As also shown in FIG. 1, each memory module 16, 18 has multiple, independent memory banks, 16a, 16b for module 16 and 18a, 18b, and 18c for module 18. The number of memory banks per module is by way of example and it should be understood that in a preferred embodiment each memory module could have more or less memory banks or each memory module could have an equal number of memory banks. The addressing of main memory in a preferred embodiment allows for a flexible number of banks per memory module which will be explained in more detail below.

Figure 2:
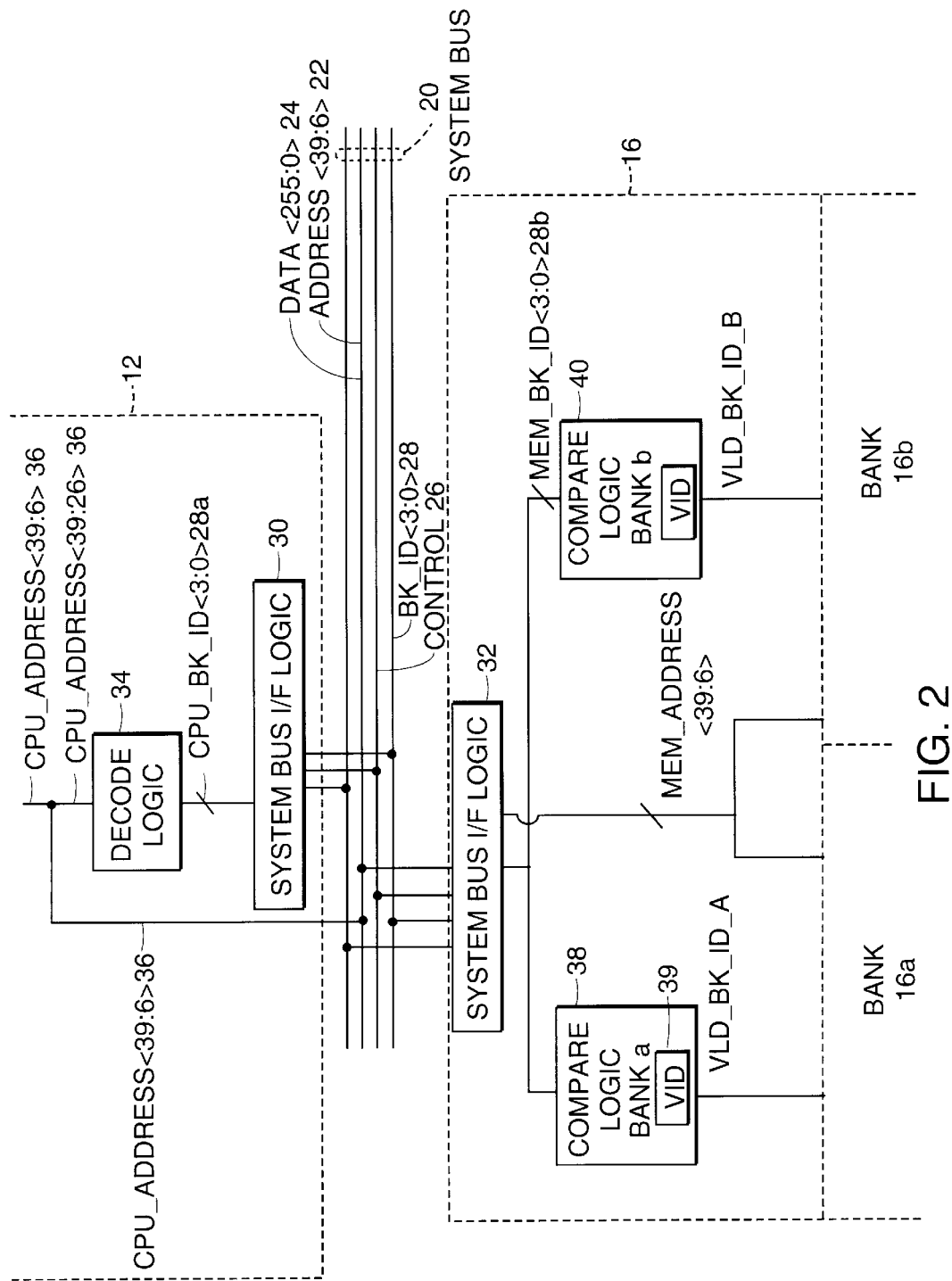
FIG. 2 is a more detailed block diagram of one of the plurality of CPU modules and one of the plurality of memory modules of FIG. 1.

Referring now to FIG. 2, the system bus 20, including address signals 22, data signals 24, and control signals 26 is shown interconnecting a portion of CPU module 12 and memory module 16. The control signals 26 on system bus 20 further include separate memory bank identification signals 28. One of skill in the art will understand that the system bus 20 could include combined address/data signals, however, a preferred embodiment of the system bus includes separate address lines and data lines.

By way of example, the computer system will be described as supporting one Terabyte of main memory and sixty-four byte block data transfers (i.e., sixty-four byte blocks of data are transferred with each system bus transaction directed at main memory where eight bits equals a byte and five hundred and twelve bits equals a sixty-four byte block). In order to address sixty-four byte blocks of data, the least significant address bit needed is bit six.

Therefore, the address signal lines 22 are denoted as ADDRESS <39:6>. Each transaction will involve two data cycles where each cycle transfers two hundred and fifty-six bits of data. Thus, the data signal lines 24 are denoted as DATA <255:0> 24.

Also by way of example, the present system will be limited to a maximum of sixteen memory banks. Thus, four memory bank identification signals 28 are needed (i.e., $2^4=16$ permutations) and are denoted as BK_ID <3:0> 28.

The following description will be with reference to CPU 12 and memory module 16. However, it is to be understood that the description of CPU 12 applies to CPU 14, as well as other CPU modules (not shown) and other commander modules capable of initiating transactions directly with main memory, including I/O module 15. Similarly, the description of memory module 16 applies to memory module 18, as well as other memory modules (not shown).

CPU 12 and memory module 16 are shown to include each module's system bus interface 30, 32, respectively. CPU 12 includes decode logic 34 which receives, from one or more processors on CPU 12 (not shown) or other control logic on I/O module 15 (not shown), a portion of the available address signals 36 to be driven onto system bus 20. The portion of the address signals 36 indicates which memory bank the processor or other logic is attempting to access (i.e., target of the transaction).

By way of example, decode logic 34 receives fourteen (i.e., CPU_ADDRESS <39:26>) of the available thirty-four address signals (i.e., CPU_ADDRESS <39:6> 36). The least significant address bit <26> indicates the smallest allowable single bank capacity (i.e., here each memory bank stores at least $2^{26}$ bytes, 64 mega-bytes, of data, when each addressable location is used to store a byte of data).

Decode logic 34 decodes CPU_ADDRESS <39:26> to determine which memory bank 16a, 16b, 18a, 18b, or 18c (FIG. 1) is the target of the intended transaction. The actual decode will be described in more detail below. Decode logic 34 then drives memory bank identification signals, CPU_BK_ID <3:0> 28a, with logic levels corresponding to the memory bank to be accessed. The CPU system bus interface logic 30 receives CPU_BK_ID <3:0> 28a, and if CPU 12 gains control of system bus 20, CPU bus interface logic 30 will drive BK_ID <3:0> 28 with logic levels which correspond to the logic levels on CPU_BK_ID <3:0> 28a. The CPU bus interface logic 30 will also drive ADDRESS <39:6> 22 of system bus 20 with logic levels which correspond to the logic levels on CPU_ADDRESS <39:6> 36, CONTROL 26 with logic levels corresponding to an appropriate command, and DATA <255:0> 24 with logic levels corresponding to data to be transferred, in the case of a write.

As also shown in FIG. 2, memory module 16 includes compare logic 38, 40 for memory banks 16a and 16b, respectively. The memory system bus interface logic 32 receives BK_ID <3:0> 28 from system bus 20 and drives memory bank identification signals, MEM_BK_ID <3:0> 28b, with logic levels corresponding to the logic levels on BK_ID <3:0> 28. The compare logic 38, 40 receives MEM_BK_ID <3:0> 28b, from system bus interface logic 32 and determines whether its associated memory bank is the target of the current transaction. This determination will be described in more detail below.

At power-up, the computer system's configuration software determines what memory modules are on the system bus, how many banks each memory module has, and the capacity each memory bank has. With this information, the configuration software decides which memory bank will respond to which range of system bus addresses.

There may also be times when the configuration software is called upon to reconfigure memory. For example, where a memory module or bank experiences errors, the configuration software may reconfigure memory such that the failing memory bank or the failing portion of the memory bank is not within the total address range of memory.

In the present system, each module, including I/O module 15, capable of initiating transactions directly with main memory contains decode logic similar to decode logic 34 of CPU 12 (FIG. 2). Within decode logic 34, there are several memory bank mapping registers. The configuration software of the present computer system loads the memory bank mapping registers with information as to which memory bank will respond to which addresses. Further, each memory bank includes compare logic similar to compare logic 38, 40 of memory module 16 (FIG. 2). Within compare logic 38 is a virtual identification register 39 (i.e., VID register) indicating to which memory addresses the corresponding memory bank will respond. The configuration software loads the VID registers associated with each memory bank with the address range to which the memory bank will respond.

Figure 3:
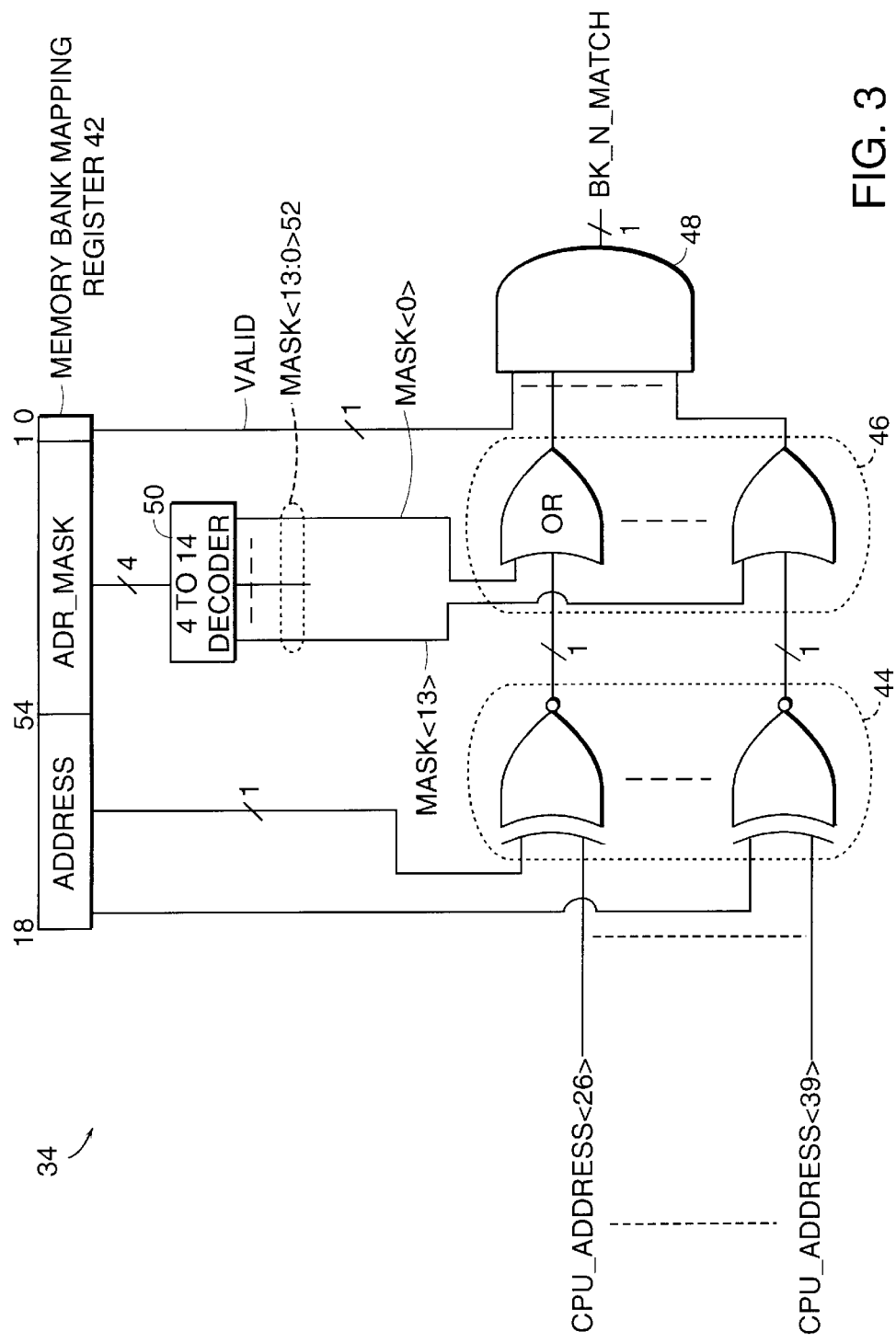
FIG. 3 is a more detailed block diagram of the decode logic of FIG. 2 in accordance with the invention.

FIG. 3 shows a more detailed diagram of decode logic 34 of CPU 12 (FIG. 2). A memory bank mapping register 42 is shown in FIG. 3 to include an address field, Address <18:5>, an address mask field, Adr_mask <4:1>, and a valid bit, VALID. As previously mentioned, decode logic 34 will include a plurality of memory bank mapping registers (not shown) equal to the maximum number of memory banks available on the system bus. Memory bank mapping register 42 will be described as an example.

A computer system may not necessarily have the maximum allowable number of memory banks available, and thus, the configuration software sets (i.e., asserts, logic level high or one) the VALID bit in each memory bank mapping register that corresponds to an available memory bank. Further, if a memory bank experiences errors or faults, the configuration software can reconfigure memory such that the faulty memory bank is not included in main memory by reassigning address ranges and deasserting the VALID bit in the memory bank mapping register corresponding to the failing memory bank.

Address <18:5> is loaded by the configuration software with the address range to which memory bank mapping register 42 will respond. For each address driven by a processor on CPU 12, each bit of Address <18:5> is compared with each bit of CPU_ADDRESS <39:26> 36 through a series of fourteen, two-input exclusive NOR (i.e., XNOR) gates 44. Each XNOR gate will provide a logic high at its output if the two inputs are the same logic level (i.e., both logic high or both logic low).

The outputs of each of XNOR gates 44 are sent to an input of a series of fourteen, two-input OR gates 46. If each bit of Address <18:5> and CPU_ADDRESS <39:26> match, then each of XNOR gates 44 will output a logic high which will cause each of OR gates 46 to output a logic high. If the VALID bit is a logic high, then all the inputs to AND gate 48 will be a logic high which will cause the output of AND gate 48, BK_N_MATCH, to be a logic high indicating that the memory bank associated with memory bank mapping register 42 is the memory bank the processor driving CPU_ADDRESS <39:6> is trying to access.

Depending upon the capacity of the corresponding memory bank, some of the bits of Address <18:5> and CPU_ADDRESS <39:26> 36 should not be compared. For example, where a memory bank is capable of storing more than the minimum amount of data (i.e., $2^{26}$ addressable locations), the least significant address bit necessary to determine the memory bank's address range will be higher than CPU_ADDRESS <26>. In this case, one or more of the lower order address bits of CPU_ADDRESS <39:26> will change for accesses to different addressable locations within the same memory bank. Because the bits of Address <18:5> are fixed by the configuration software when memory is configured or reconfigured, a compare of a portion of lower order bits of Address <18:5> to the changing lower order bits of CPU_ADDRESS <39:26> would produce a logic low or a miscompare. Thus, where a memory bank has a storage capacity larger than the minimum allowable storage capacity, a portion of the lower order bits of Address <18:5> and CPU_ADDRESS <39:26> should not be compared.

In order to provide for this flexibility, the Adr_mask <4:1> field is provided. These four bits are passed through decoder 50 which provides fourteen mask bits, MASK <13:0× 52, according to the following table, where the first column, IN, represents the binary value of Adr_mask <4:1> and the following fourteen columns, OUT, represent the binary value of MASK <13:0× 52:

gates. This allows BK_N_MATCH to be asserted even if the lower order, Address <3:0× and CPU_ADDRESS <29:26>, do not match. Thus, a portion of the lower order address bits of Address <3:0× and CPU_ADDRESS <39:26> can be masked by Adr_mask <3:0× such that memory banks of varying sizes can be used in the same computer system.

As discussed above, each module capable of initiating a transaction directly with main memory has logic similar to decode logic 34 (FIG. 2) which includes a plurality of memory bank mapping registers 42 and associated matching logic (FIG. 3). There will be one BK_N_MATCH signal for each memory bank mapping register, and the N in BK_N_MATCH will be a number corresponding to the associated memory bank, for example, BK_1_MATCH, BK_8_MATCH, etc. In the present system, there are four memory bank identification signals, BK_ID <3:0× 28 (FIG. 2), indicating that the computer system can support a maximum of sixteen memory banks. If memory is not interleaved, sixteen memory mapping registers are needed to support sixteen memory banks.

Figure 4:
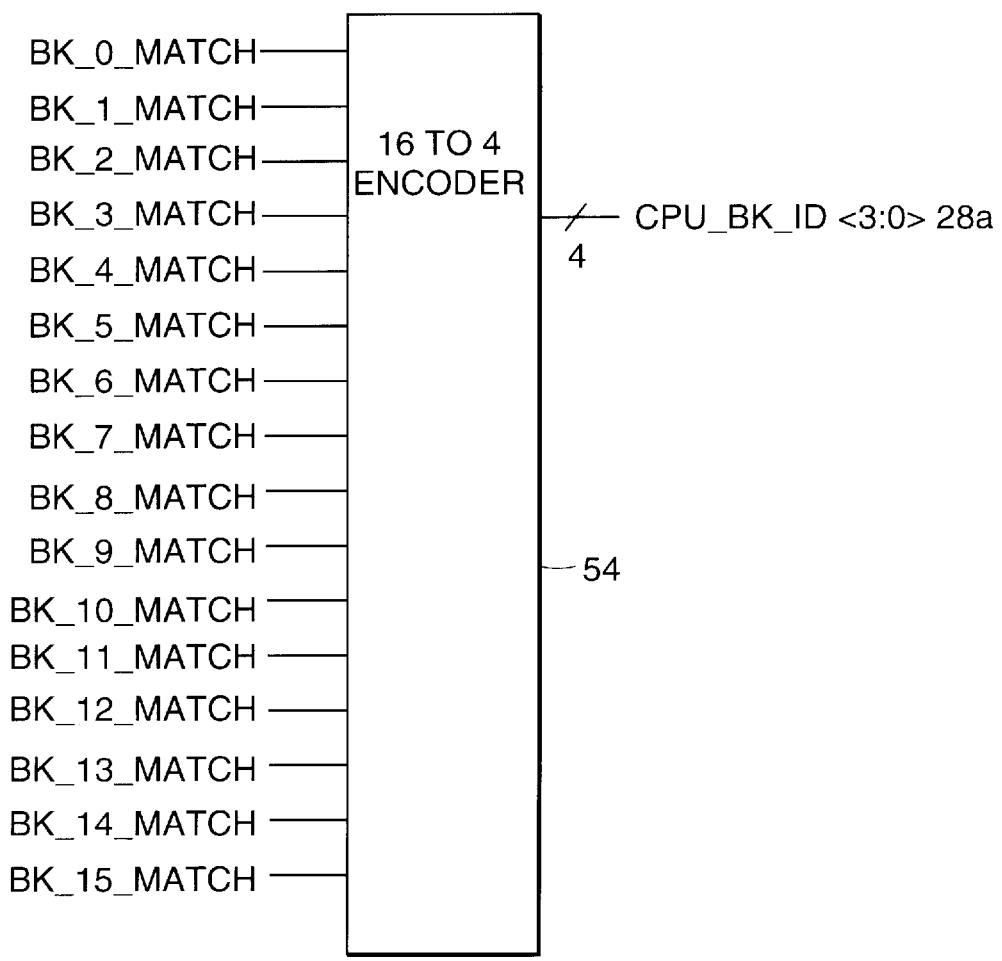
FIG. 4 is a more detailed block diagram of the decode logic of FIG. 2 in accordance with the invention.

Referring now to FIG. 4, a sixteen bit to four bit encoder 54 is shown. Each memory bank mapping register and

| IN | | | | | | | | OUT | | | | | | | | | |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 1 | 1 |
| 0 | 0 | 0 | 1 | 0 | 0 | 0 | 0 | 0 | 0 | 0 | 0 | 0 | 0 | 0 | 1 | 1 | 1 |
| 0 | 1 | 0 | 0 | 0 | 0 | 0 | 0 | 0 | 0 | 0 | 0 | 0 | 0 | 1 | 1 | 1 | 1 |
| 0 | 1 | 0 | 0 | 0 | 0 | 0 | 0 | 0 | 0 | 0 | 0 | 0 | 1 | 1 | 1 | 1 | 1 |
| 0 | 1 | 0 | 0 | 0 | 0 | 0 | 0 | 0 | 0 | 0 | 0 | 1 | 1 | 1 | 1 | 1 | 1 |
| 0 | 1 | 0 | 0 | 0 | 0 | 0 | 0 | 0 | 0 | 0 | 1 | 1 | 1 | 1 | 1 | 1 | 1 |
| 1 | 0 | 0 | 0 | 0 | 0 | 0 | 0 | 0 | 0 | 1 | 1 | 1 | 1 | 1 | 1 | 1 | 1 |
| 1 | 0 | 0 | 0 | 0 | 0 | 0 | 0 | 0 | 1 | 1 | 1 | 1 | 1 | 1 | 1 | 1 | 1 |
| 1 | 0 | 0 | 0 | 0 | 0 | 0 | 0 | 1 | 1 | 1 | 1 | 1 | 1 | 1 | 1 | 1 | 1 |
| 1 | 0 | 0 | 0 | 0 | 0 | 0 | 1 | 1 | 1 | 1 | 1 | 1 | 1 | 1 | 1 | 1 | 1 |
| 1 | 1 | 0 | 0 | 0 | 0 | 1 | 1 | 1 | 1 | 1 | 1 | 1 | 1 | 1 | 1 | 1 | 1 |
| 1 | 1 | 0 | 1 | 0 | 1 | 1 | 1 | 1 | 1 | 1 | 1 | 1 | 1 | 1 | 1 | 1 | 1 |
| 1 | 1 | 1 | 0 | 1 | 1 | 1 | 1 | 1 | 1 | 1 | 1 | 1 | 1 | 1 | 1 | 1 | 1 |

If all available address bits (i.e., Address <18:5> and CPU_ADDRESS <39:6>) are to be used, the configuration software loads Adr_mask <4:1> with logic lows, zeros in the table, which are decoded by decoder 50 to provide MASK <13:0× 52 with all logic low values, according to the above table. These logic lows would be passed to OR gates 46. The output of OR gates 46 would then be dependent upon the output of the XNOR gates 44 (i.e., if the XNOR gate outputs a logic high, then the OR gate will output a logic high, and if the XNOR gate outputs a logic low, then the OR gate will output a logic low).

On the other hand, if less than all the available address bits are to be used, the configuration software would load Adr_mask <4:1> with something other than zero, for example, a binary value of four (i.e., 0100). Decoder 50 would then provide MASK <13:4> with logic low and MASK <3:0× with logic high, according to the table. Thus, the outputs of the OR gates of the series of OR gates 46 which receive the outputs of the XNOR gates of the series of XNOR gates 44 which compare Address <13:4> to CPU_ADDRESS <39:30> would depend upon the results of the XNOR gates, as above. However, the outputs of the OR gates which receive the outputs of the XNOR gates which compare Address <3:0> to CPU_ADDRESS <29:26> will always be a one, because MASK <3:0× are logic highs (i.e., ones in the table) which force the OR gates to output logic highs regardless of the output of the XNOR associated matching logic provides one BK_N_MATCH signal which is encoded into CPU_BK_ID <3:0× 28a and driven to CPU system bus interface logic 30 (FIG. 2).

As discussed above, interleaving is the practice of storing data in consecutive memory locations in alternating or successive memory banks. In the present computer system, the memory bank mapping registers within decode logic 34 (FIG. 2) can be expanded to include fields which provide for memory interleaving.

Figure 5:
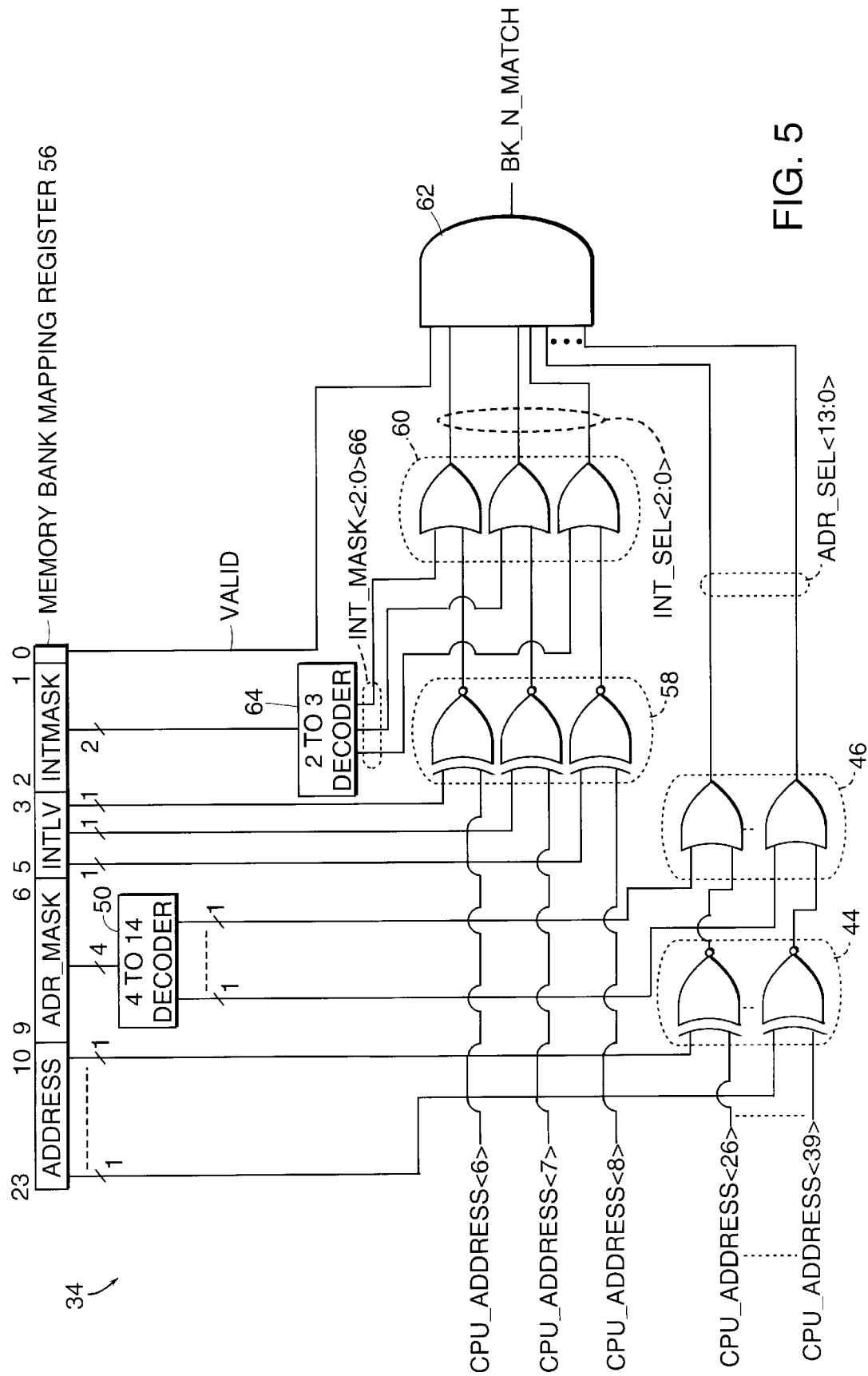
FIG. 5 is a more detailed block diagram of the decode logic of FIG. 2 in accordance with the invention.

Referring now to FIG. 5, an expanded memory bank mapping register 56 is shown to include an address field, Address <23:10>, an address mask field, Adr_mask <9:6>, an interleave field, Intlv <5:3>, an interleave mask field, Intmask <2:1>, and a VALID bit. The address field, address mask field and VALID bit are used in a manner identical to their use with respect to FIG. 3 and similarly numbered figure elements represent identical functions and will not be further described.

The configuration software may configure the available memory banks such that two or more of the banks are interleaved. By way of example, the interleave field is three bits wide, Intlv <5:3>, which provides for a maximum of eight-way interleaving. A greater number of banks may be interleaved by using each memory bank mapping register to decode more than one memory bank match signal which will be described in more detail below.

As shown in FIG. 5, each of the three interleave bits go to an input of a series of three, two-input XNOR gates 58, while CPU_ADDRESS <8:6> are driven to a second input of the series of XNOR gates 58. If both inputs to the XNOR gates are the same (i.e., both logic high or both logic low), then the XNOR gate will produce a logic level high at its output, otherwise the XNOR gate provides a logic level low at its output. Each of the outputs of the XNOR gates 58 are connected to an input of a series of three, two-input OR gates 60. If the XNOR gate outputs are logic highs, then the OR gate outputs will also be logic highs. The outputs of the OR gates 60, INT_SEL <2:0>, are then provided to AND gate 62 along with the outputs of the OR gates 46, ADR_SEL <13:0>, and the VALID bit. If all inputs to AND gate 62 are a high logic level, then the output of the AND gate 62, BK_N_MATCH, will also be a logic high.

In order to provide for multiple-way interleaving (i.e., 2-way, 4-way, etc.), the interleave mask field, Intmask <2:1>, is loaded by the configuration software to indicate which interleave bits should be considered and which ignored. The Intmask <2:1> bits are provided to a two to three decoder 64 which provides INT_MASK <2:0> 66 bits to the second input of OR gates 60 according to the following table, where the first two columns, IN, represents the binary value of Intmask <2:1> and the following three columns, OUT, represent the binary value of INT_MASK <2:0> 66:

| IN | | OUT | | |
|---|---|---|---|---|
| 0 | 0 | 1 | 1 | 1 |
| 0 | 1 | 1 | 1 | 0 |
| 1 | 0 | 1 | 0 | 0 |
| 1 | 1 | 0 | 0 | 0 |

If there is to be no interleaving (i.e., interleaving disabled), the configuration software will set interleave mask bits, Intmask <2:1>, to all logic lows, zeros in the table. This will cause decoder 64 to provide INT_MASK <2:0> with all logic high values which will force the outputs of OR gates 60 high regardless of whether the bits in Intlv <5:3> match CPU_ADDRESS <8:6>.

Conversely, if there is to be interleaving, the configuration software will set Intmask <2:1> to some value other than zero. For example, if Intmask <2:1> are set to a value of two (i.e., binary 10), decoder 64 will provide a value of four (i.e., binary 100), according to the table, on INT_MASK <2:0>. INT_MASK <2> being a logic high will force a logic high on the output of the OR gate of the series of OR gates 60 regardless of whether Intlv <5> matches CPU_ADDRESS <8>. However, INT_MASK <1:0> will be logic lows which allows the result of the XNOR gates, of the series of XNOR gates 58, which are comparing Intlv <4:3> to CPU_ADDRESS <7:6> to determine the results of the OR gates of the series of OR gates 60. Through the expanded memory bank mapping register 56, the configuration software can interleave eight of the memory banks, less than eight of the memory banks, or none of the memory banks.

As described above, each of the memory bank mapping registers and associated matching logic provide a BK_N_MATCH signal. The sixteen to four encoder 54 of FIG. 4 works equally well with the expanded memory bank mapping registers and their associated matching logic to provide CPU_BK_ID <3:0× 28a.

In order to reduce the number of memory bank mapping registers needed on each commander module without reducing the number of available memory banks, each memory bank mapping register can be used to match more than one memory bank. In order to do this, there must be some amount of interleaving and the memory bank mapping registers must include a multiple-bank matching field.

Figure 6:
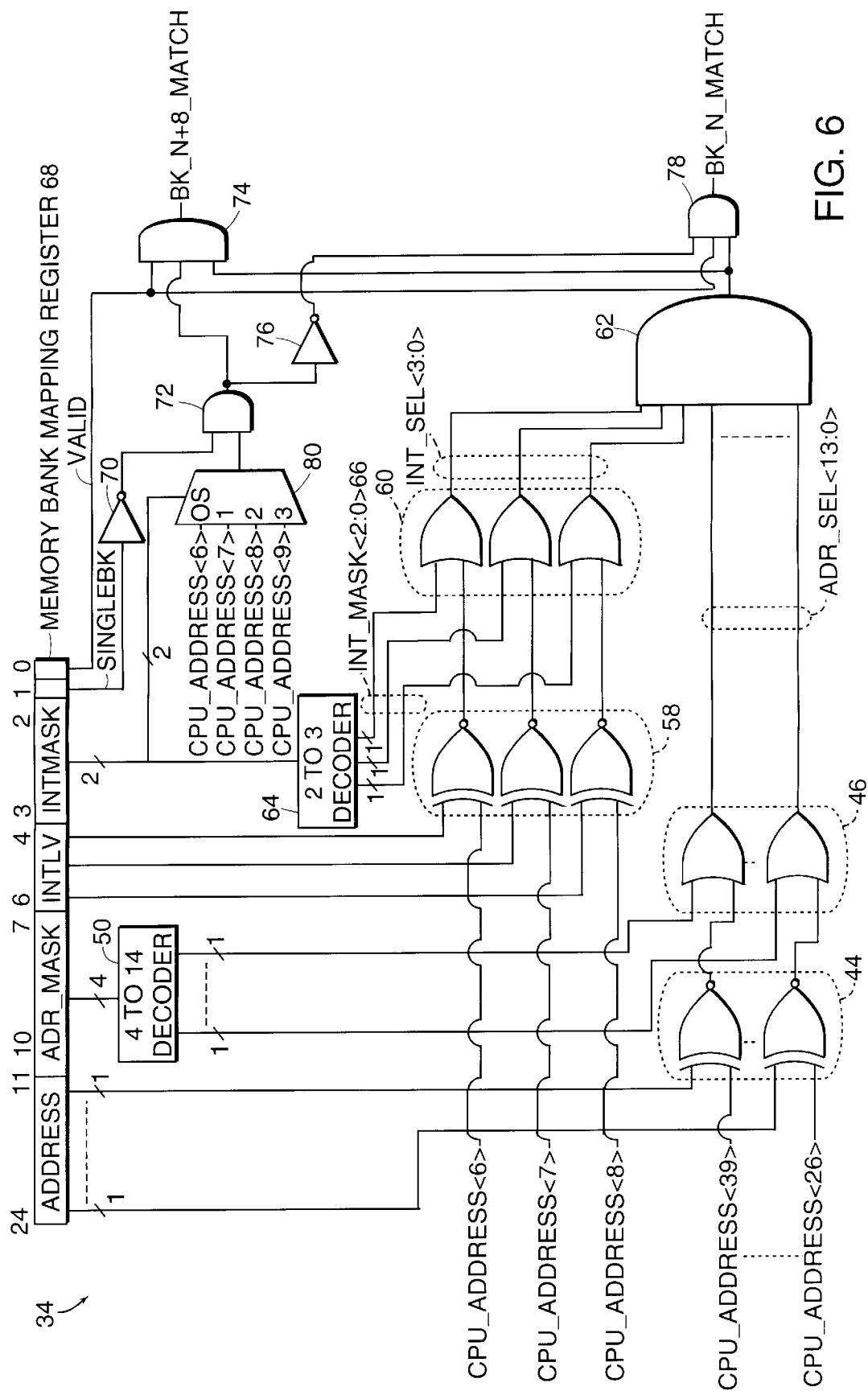
FIG. 6 is a more detailed block diagram of the decode logic of FIG. 2 in accordance with the invention.

Referring now to FIG. 6, an expanded memory bank mapping register 68 is shown to include all the fields of memory bank mapping register 56 (FIG. 5) and additionally, a multiple-bank matching field, SINGLE_BK. By way of example, the multiple bank matching field will be a single bit permitting each memory mapping register to be associated with one or two memory banks. Thus, only eight memory bank mapping registers will be needed for a computer system with sixteen memory banks. As mentioned above, identically numbered drawing elements in different figures function similarly and will not be discussed.

Because the configuration software fixes the value of SINGLE_BK, if SINGLE_BK is asserted (i.e., logic level high), then multiple bank matching is disabled and the memory bank mapping register will only be used to match a single memory bank. Stepping through FIG. 6, a logic high on SINGLE_BK causes NOT gate 70 to provide a logic low to AND gate 72 which provides a logic low to AND gate 74 and NOT gate 76 which provides a logic high to AND gate 78. Thus, AND gate 74 is disabled and one input to AND gate 78 is a logic high and will assert BK_N_MATCH if the address bits and interleave bits match as discussed above (i.e., one memory bank is mapped to one memory bank mapping register).

Conversely, if SINGLE_BK is deasserted indicating that the memory bank mapping register will be used to decode two memory banks, neither AND gate 72 nor AND gate 74 are automatically disabled. FIG. 6 shows a four bit multiplexor 80 (i.e., MUX) for which Intmask <3:2> 66 are the select bits. With SINGLE_BK at logic low, NOT gate 70 provides a logic high to one input of AND gate 72. The output of MUX 80 is connected to the second input of AND gate 72, and thus, the output of AND gate 72 depends upon the output of MUX 80.

MUX 80 determines what multiple-way interleaving will be used. As mentioned above, when one memory bank mapping register is used to match more than one memory bank, some amount of interleaving is required. Where one memory bank mapping register is used to match two memory banks, there is at least two-way interleaving. However, a higher level of interleaving is possible through MUX 80.

If only two-way interleaving is to be implemented, Intmask <3:2> is set to logic low. The decoder 64, according to the above table, provides logic high on each bit of INT_MASK <2:0>. This will force all OR gates 60 to provide a logic high output on INT_SEL <3:0× regardless of whether Intlv <6:4> matched CPU_ADDRESS <8:6>. However, when MUX 80 receives logic lows on the select lines, its first input, CPU_ADDRESS <6>, is passed to the output. If CPU_ADDRESS <6> is a logic high, then AND gate 72 provides a logic high to AND gate 74 and NOT gate 76 which causes BK_N+8_MATCH to be asserted if VALID and ADR_SEL <13:0× are logic highs. If CPU_ADDRESS <6> is a logic low, then AND gate 72 provides a logic low to AND gate 74 and NOT gate 76 which causes BK_N_MATCH to be asserted if VALID and ADR_SEL <13:0× are logic highs. Thus, two-way interleaving is achieved where BK_N_MATCH is used to select one of the lower eight numbered memory banks and BK_N+8_MATCH is used to select one of the upper eight numbered memory banks as will be discussed below.

As shown in FIG. 6, MUX 80 accepts four inputs, CPU_ADDRESS <9:6>. This allows for sixteen-way interleaving of the same sixteen memory banks. For example, if Intmask <3:2> is set to logic highs, decoder 64, according to the above table, will provide logic lows on INT_MASK <2:0>. INT_MASK <2:0> being logic lows results in the outputs of OR gates 60, INT_SEL <3:0>, being dependent upon the results of XNOR gates 58 which above resulted in eight-way interleaving. However, Intmask <3:2> are also the select lines for MUX 80, and when Intmask <3:2> are logic highs, the fourth input, CPU_ADDRESS <9>, is passed through to the output of MUX 80. This provides for sixteen-way interleaving.

Each memory bank mapping register can be used differently. For example, one or more memory bank mapping registers may have the SINGLE_BK bit asserted, and thus, only be used to match one memory bank each, and one or more memory bank mapping registers may have the SINGLE_BK bit deasserted, and thus, only be used to match at least two or more memory banks each. In any case, this is a design decision dependent upon the number of memory banks, the number of memory bank mapping registers, and the amount of interleaving desired.

Additionally, the memory bank mapping registers may be designed with a multiple-bank matching field having more than one bit allowing the memory mapping registers to be used to match multiple memory banks. For example, two bits would allow one memory bank mapping register to match four memory banks.

In the above described case, each of the memory bank mapping registers and associated matching logic provide two bank matching signals, BK_N_MATCH and BK_N+8_MATCH. All eight memory bank mapping registers send these two signals to the sixteen to four bit encoder 54 of FIG. 4 which drives CPU_BK_ID <3:0x to the CPU bus interface logic 30. Thus, only eight memory bank mapping registers are needed to decode which of sixteen memory banks the processor (not shown) is trying to access.

As mentioned above, within compare logic 38 is a VID register 39 (FIG. 2) which is loaded by the configuration software and indicates the memory addresses to which the corresponding memory bank will respond. The VID register 39 must contain a number of bits equal to the number of MEM_BK_ID <3:0x bits which equals the number of BK_ID <3:0> bits and CPU_BK_ID <3:0x bits.

Figure 7:
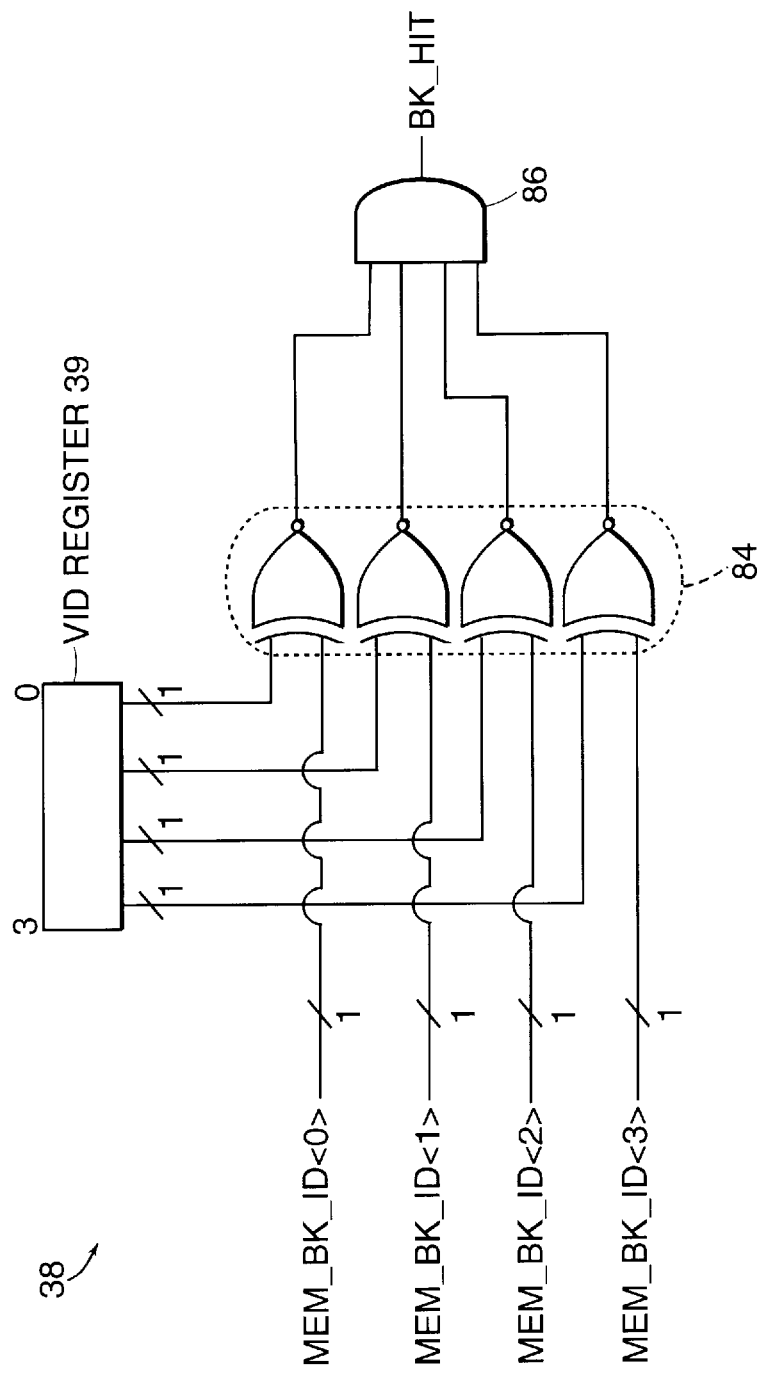
FIG. 7 is a more detailed block diagram of the compare logic of FIG. 2 in accordance with the invention.

Referring now to FIG. 7, a VID register 39 within compare logic 38 (FIG. 2) is shown to include four bits. FIG. 7 further shows a series of four, two-input XNOR gates 84 which compare each bit of MEM_BK_ID <3:0x to each bit of VID register 39. As previously mentioned, if the inputs to the XNOR gates 84 match, then the XNOR gates will provide logic highs on their outputs. As shown, the output of each XNOR gate in the series of XNOR gates 84 is connected to AND gate 86. If each of the bits of MEM_BK_ID <3:0x match each of the bits of VID register 39, then the XNOR gates 84 will drive logic highs to the inputs of AND gate 86 which will assert BK_HIT. BK_HIT indicates that the current system bus transaction is attempting to access the memory bank 16a associated with compare logic 38 and VID register 39. Thus, control logic (not shown) on memory module 16 and associated with memory bank 16a will respond to the current bus transaction.

As the previous discussion indicates, the configuration of the present computer system's main memory is flexible. In a preferred embodiment, the memory bank mapping registers permit the configuration software to interleave all, some, or none of the memory banks and additionally, allow all, some, or none of the memory bank mapping registers to be used to match multiple memory banks. Further, the flexibility in assigning address ranges to memory banks permits memory modules having different numbers of memory banks and memory banks of different sizes to be used in the same system.

Although the necessary logic on CPU modules and other modules capable of initiating transactions with main memory has been increased, the necessary logic for each memory bank to determine that it is the target of the current transaction has been decreased to only a VID register and compare logic. This also permits a memory bank to quickly determine whether or not it is the target, because the entire address does not have to be decoded.

As mentioned above, a commander module, such as a CPU or an I/O module, may determine which memory bank it wishes to access prior to arbitrating for control of the system bus. Therefore, the transaction time on the system bus will be shortened, because the CPU_BK_ID <3:0× signals will be asserted prior to or in conjunction with gaining control of the system bus. Further, once the module gains control of the system bus, the memory bank is quickly accessed when the memory bank's compare logic detects a bank hit, BK_HIT.

In systems which track available memory banks, a module may begin arbitration before the decode logic 34 has determined which memory bank is to be accessed. If the memory bank is determined to be one which is unavailable, the module can withdraw from arbitration and wait till the memory bank is available to re-arbitrate. This allows the time to determine which memory bank is to be accessed to be hidden behind the time it takes to arbitrate for the bus. Thus, the entire transaction time on the system bus is shortened significantly. The CPU's memory bank decode time is hidden behind the arbitration time and the memory bank's response is quick due to the VID register and compare logic.

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. A computer system, comprising:
   a system bus including a plurality of memory bank identification signal lines, said plurality of signal lines being in addition to address signal lines of said system bus;
   a plurality of memory modules coupled to said system bus, wherein each of said memory modules includes at least one memory bank in which data is stored in addressable locations;
   a commander module coupled to said system bus, said commander modules being capable of initiating transactions on said system bus and comprising:
      means for generating an address to be driven on said system bus; and
      means for decoding said address to provide values to be driven on said memory bank indentification signal lines; and
   wherein each of said plurality of memory banks includes means responsive to a predetermined value driven on said memory bank identification signal lines for responding to commander initated transactions on said system bus.

2. The computer system according to claim 1, wherein said decoding means includes a plurality of memory mapping registers, where each of said plurality of memory mapping registers corresponds to a unique value to be driven on said memory bank identification signal lines, and wherein said decoding means further includes matching logic associated with each of said plurality of memory mapping registers for determining whether said address corresponds to said associated memory mapping register, and encoding logic for providing said unique values to be driven on said memory bank identification signal lines.

3. The computer system according to claim 2, wherein each of said plurality of memory mapping registers includes an address field, an address mask field, and a valid bit.

4. The computer system according to claim 2, wherein each of said plurality of memory mapping registers includes an address field, an address mask field, an interleave field, an interleave mask field, and a valid bit.

5. The computer system according to claim 2, wherein each of said plurality of memory mapping registers includes an address field, an address mask field, an interleave field, an interleave mask field, a multiple-bank matching field, and a valid bit.

6. The computer system according to claim 2, wherein each of said plurality of memory mapping registers corresponds to a plurality of unique values to be driven on said memory bank identification signal lines.

7. The computer system according to claim 2, wherein said plurality of memory mapping registers are dynamically loaded by memory configuration software.

8. The computer system according to claim 1, wherein said responding means comprises compare logic including a virtual node identification register for storing said predetermined value.

9. The computer system according to claim 8, wherein said virtual node identification register is dynamically loaded by memory configuration software.

10. The computer system according to claim 1, wherein each of said plurality of memory modules includes a plurality of memory banks and wherein said plurality of memory banks is an equal number for each of said plurality of memory modules.

11. The computer system according to claim 1, wherein each of said plurality of memory modules includes a plurality of memory banks and wherein said plurality of memory banks is different for each of said plurality of memory modules.

12. The computer system according to claim 1, wherein each of said plurality of memory modules includes a plurality of memory banks and wherein said plurality of memory banks have a different number of addressable locations.

* * * * *